United States Patent
Blecha

(10) Patent No.: US 8,960,641 B2
(45) Date of Patent: Feb. 24, 2015

(54) VACUUM VALVE

(71) Applicant: VAT Holding AG, Haag (CH)

(72) Inventor: Thomas Blecha, Feldkirch (AT)

(73) Assignee: VAT Holding AG, Haag (CH)

( * ) Notice: Subject to any disclaimer, the term of this patent is extended or adjusted under 35 U.S.C. 154(b) by 253 days.

(21) Appl. No.: 13/676,523

(22) Filed: Nov. 14, 2012

(65) Prior Publication Data

US 2014/0131603 A1 May 15, 2014

(51) Int. Cl.
*F16K 51/02* (2006.01)

(52) U.S. Cl.
CPC ........................... *F16K 51/02* (2013.01)
USPC .............................. 251/158; 251/195; 251/229

(58) Field of Classification Search
USPC .................. 251/158, 193, 195, 215, 229, 284
See application file for complete search history.

(56) References Cited

U.S. PATENT DOCUMENTS

| | | | | |
|---|---|---|---|---|
| 6,390,448 | B1 * | 5/2002 | Kroeker et al. | 251/195 |
| 6,390,449 | B1 * | 5/2002 | Ishigaki et al. | 251/193 |
| 6,899,316 | B2 | 5/2005 | Duelli | |
| 7,066,443 | B2 * | 6/2006 | Ishigaki | 251/195 |
| 7,128,305 | B2 * | 10/2006 | Tomasch | 251/211 |
| 7,441,747 | B2 * | 10/2008 | Chen | 251/193 |
| 7,445,019 | B2 * | 11/2008 | Brenes et al. | 251/193 |
| 2007/0272888 | A1 | 11/2007 | Tichy | |
| 2008/0017822 | A1 | 1/2008 | Schoen et al. | |
| 2008/0302989 | A1 | 12/2008 | Seitz | |
| 2011/0175011 | A1 | 7/2011 | Ehrne et al. | |
| 2012/0258242 | A1 | 10/2012 | Tsunoda et al. | |

FOREIGN PATENT DOCUMENTS

WO  2010034046  4/2010

* cited by examiner

*Primary Examiner* — John Bastianelli
(74) *Attorney, Agent, or Firm* — Volpe and Koenig, P.C.

(57) ABSTRACT

A vacuum valve having a valve rod (11) which has a longitudinal axis (20) and which carries at least one closing member (9, 10) for closing at least one valve orifice (2, 3) and which can be displaced by a longitudinal drive (18), in a longitudinal direction (21) lying parallel to the longitudinal axis (20) of the valve rod (11), from an initial position, in which the vacuum valve is open, into an intermediate position and can be displaced by a transverse drive (19) from the intermediate position to at least one end position in which the vacuum valve is closed. A transmission piece (23) which is guided displaceably in the longitudinal direction (21) by at least one guide part (24) is secured to the valve rod (11). At least one transverse drive part (26) of the transverse drive (19) engages on the guide part (24), the guide part (24) being displaceable in the transverse direction (22) by the transverse drive (19) via the at least one transverse drive part (26), and the guide part (24), during its displacement in the transverse direction (22), taking along the transmission piece (23).

14 Claims, 9 Drawing Sheets

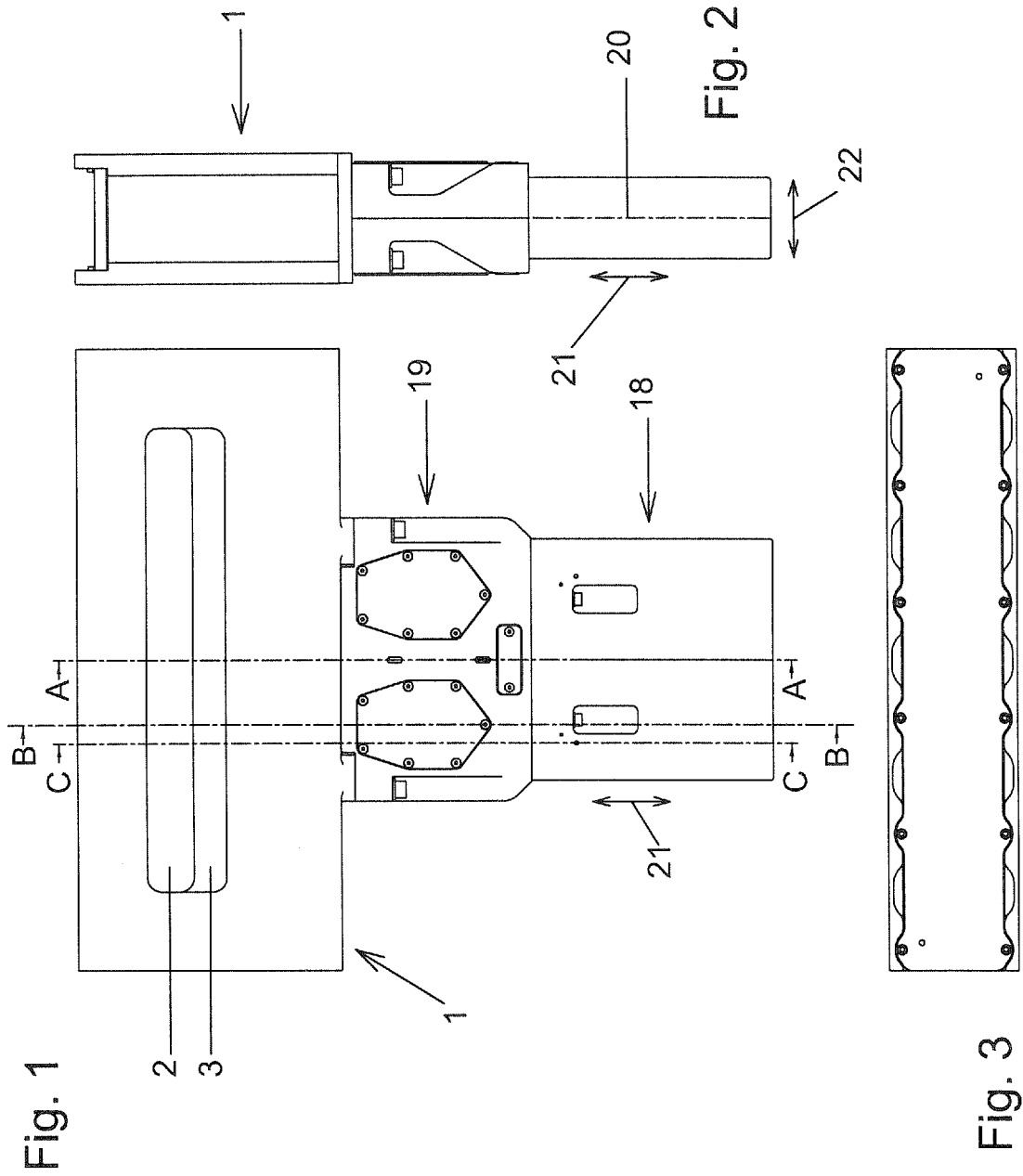

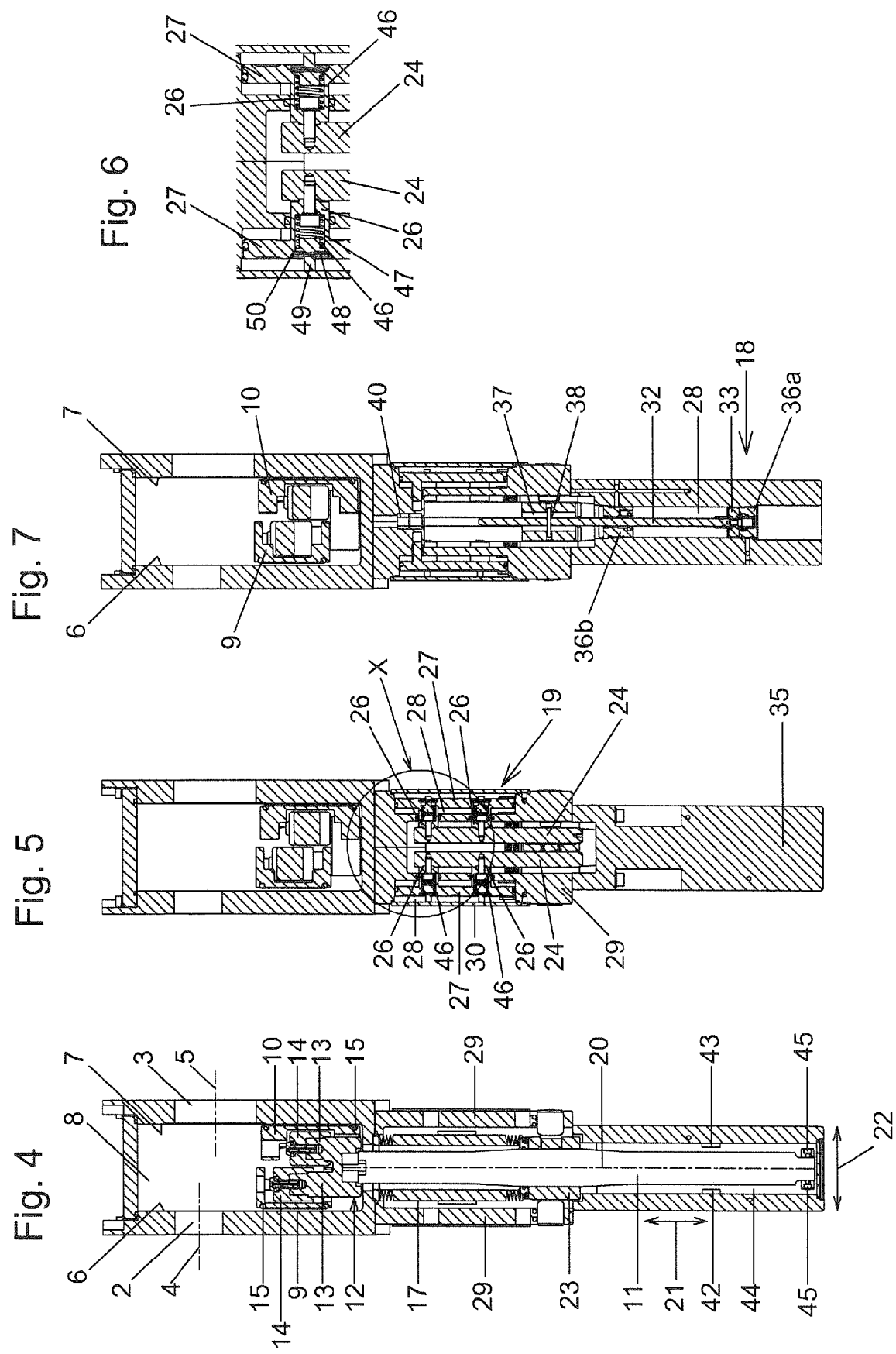

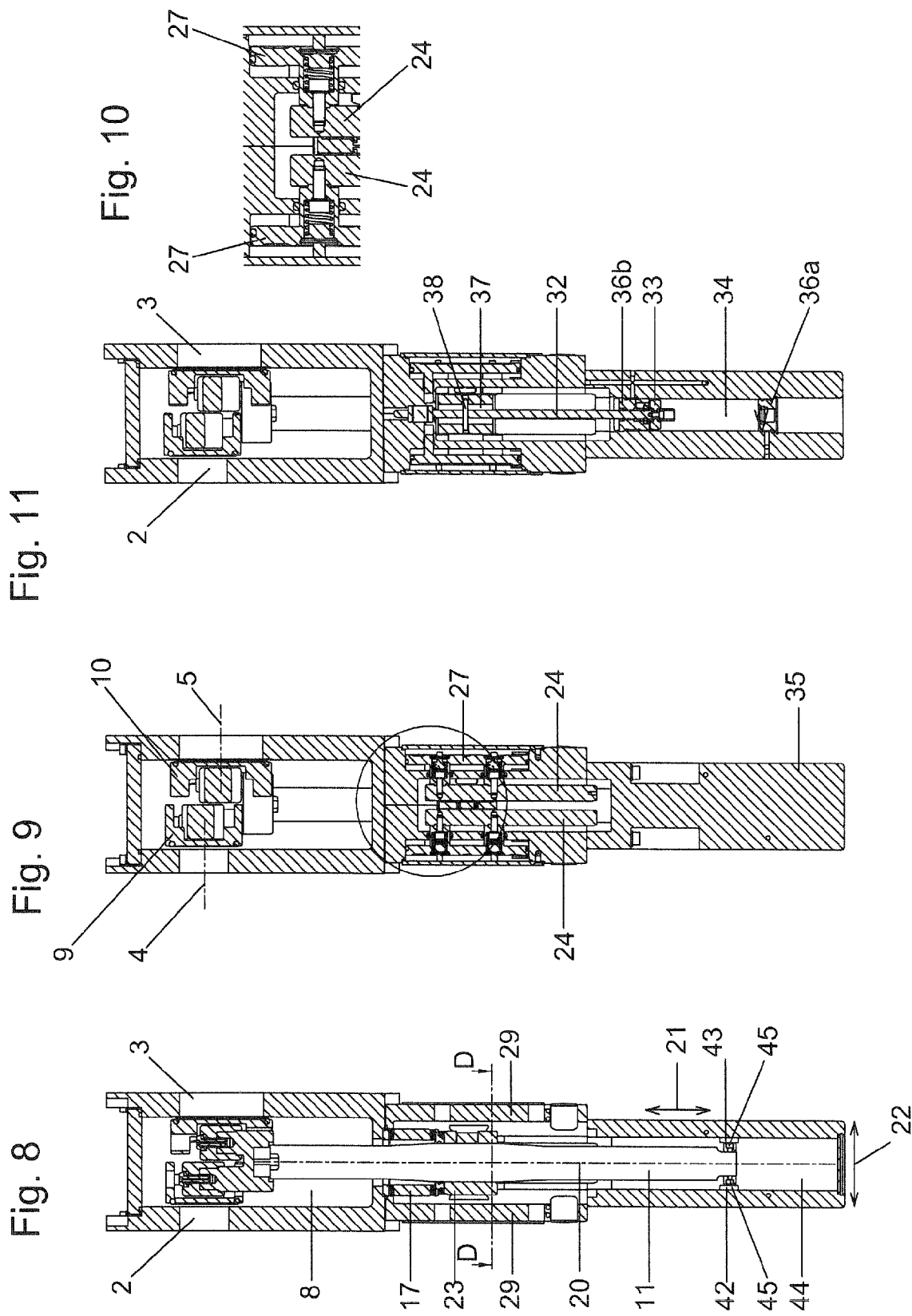

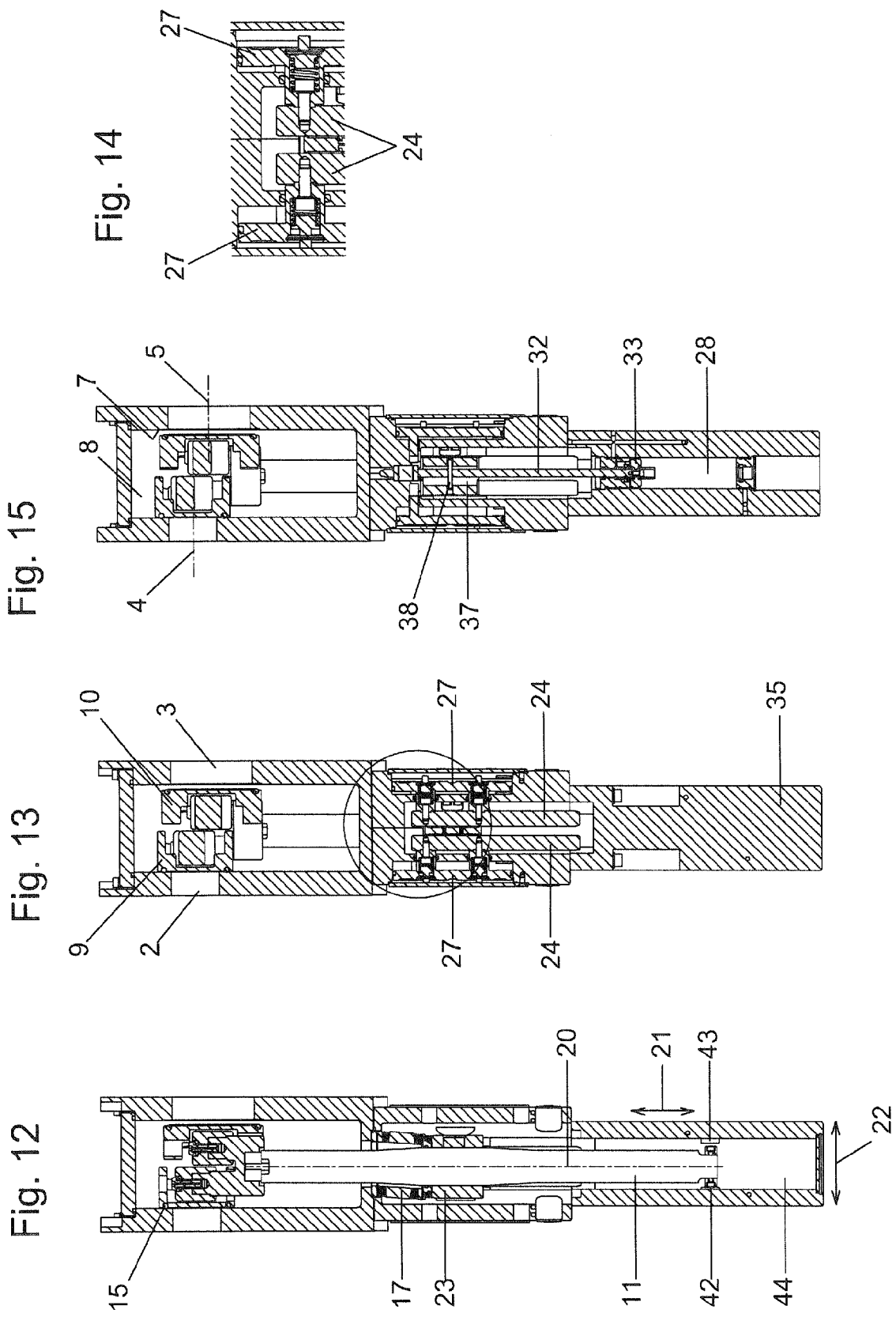

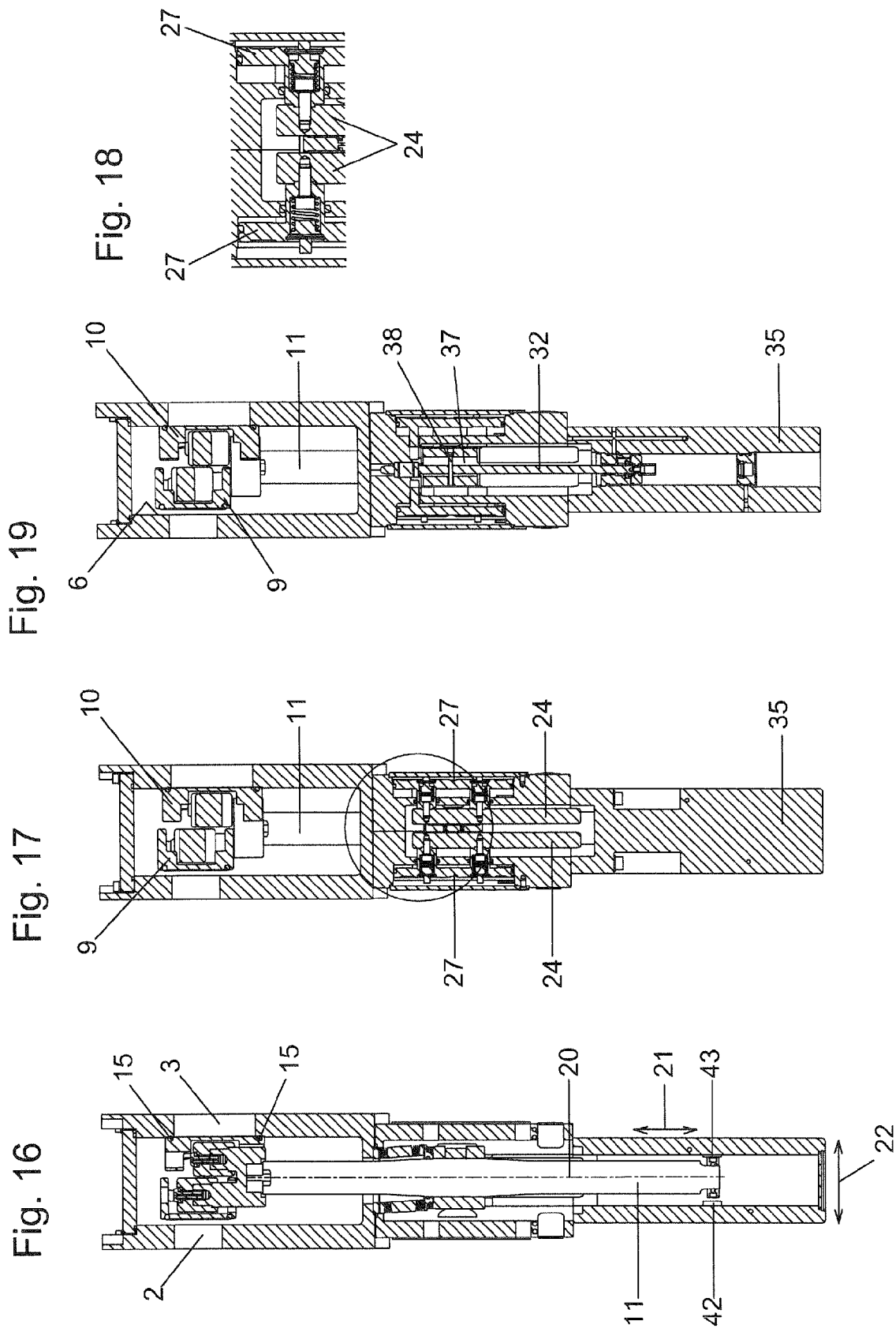

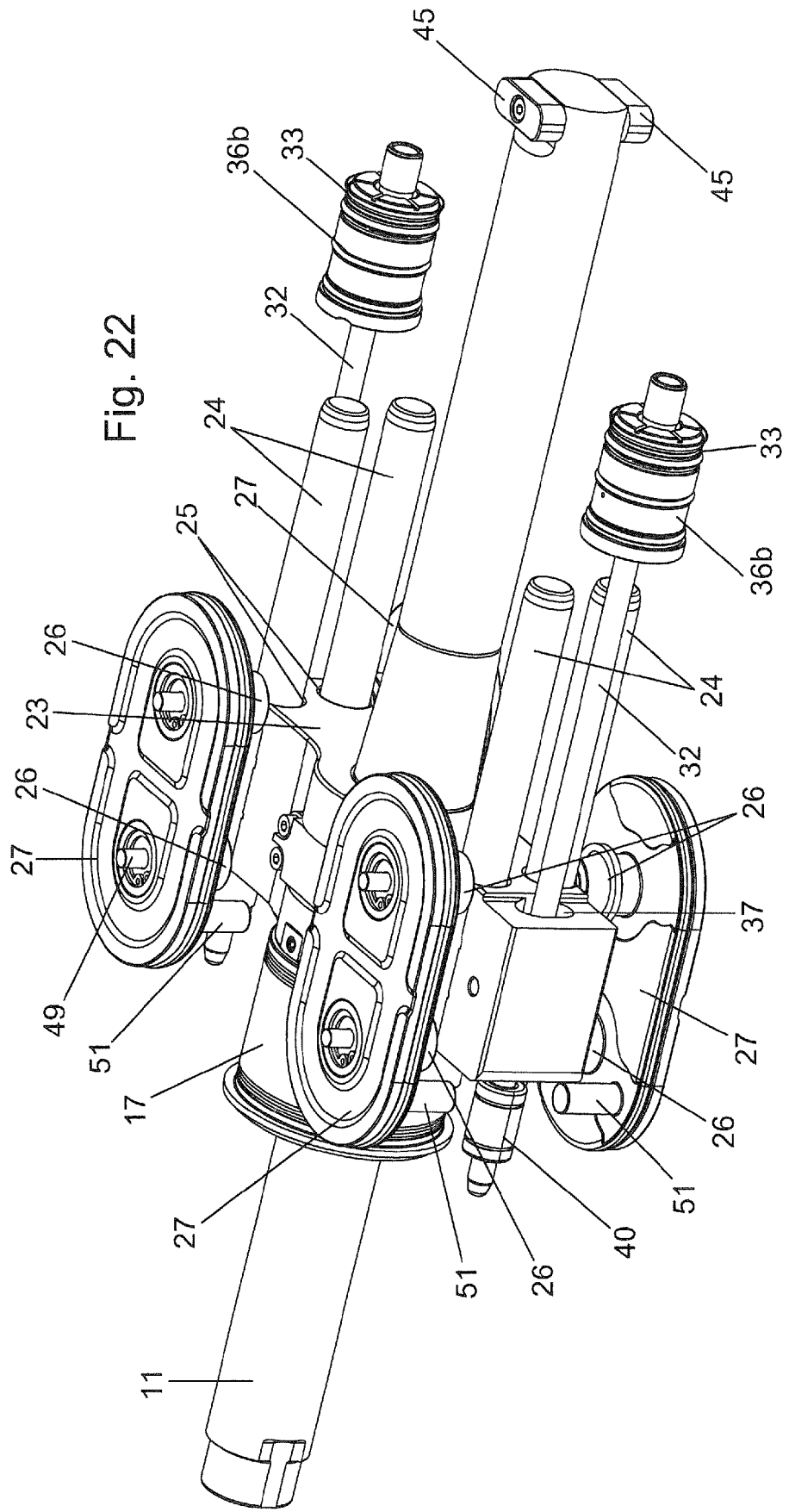

VACUUM VALVE

BACKGROUND

The invention relates to a vacuum valve with a valve rod which has a longitudinal axis and which carries at least one closing member for closing at least one valve orifice and which can be displaced by a longitudinal drive, in a longitudinal direction lying parallel to the longitudinal axis of the valve rod, from an initial position, in which the vacuum valve is open, into an intermediate position, and can be displaced by a transverse drive from the intermediate position to at least one end position in which the vacuum valve is closed.

Vacuum valves, in which a closing member can be moved from an open position through a middle position, in which the closing member overlaps a valve orifice, but is lifted off from the valve seat, into a closing position, are designated as L-valves. In addition to designs in which the adjustment of the closing member from the middle position into the closing position takes place as a result of pivoting of the valve rod carrying the closing member about an axis lying at right angles to the valve rod, designs are also known in which rectilinear adjustment of the closing member between its middle position and its closing position takes place. For example, designs are known in which a carrying unit is fastened to the valve rod, the closing member being adjustable with respect to the carrying unit by means of piston/cylinder units. Such designs may be gathered, for example, from US 2007/0272888 A1 and U.S. Pat. No. 6,899,316.

US 2008/0017822 A1 discloses an L-valve in which the closing member is attached to a valve rod which is guided displaceably in its longitudinal direction and can be displaced in the longitudinal direction by means of a longitudinal drive formed by a piston/cylinder unit. By means of a guide device, which in one embodiment is formed by a linear guide, this piston/cylinder unit is guided displaceably in a transverse direction at right angles to the longitudinal direction, with the result that the valve rod can also be displaced in the transverse direction. To adjust the valve rod in the transverse direction, there is a piston/cylinder unit integrated into the closing member. In a further embodiment, the transverse drive device is formed by a piston/cylinder unit which is arranged outside the vacuum region and which acts upon the cylinder of the longitudinal drive device. It is stated that such an embodiment is suitable particularly for applications in which the closing member is acted upon only by a differential pressure which presses the closing member onto the valve seat. In this case, there is no need for a high closing force pressing the closing member onto the valve seat to be applied. A transmission of a higher closing force would present problems with the transverse guide which may be gathered from this publication.

An L-valve of the type initially mentioned may be gathered from WO 2010/034046 A1. The valve rod of cylindrical cross section, in the exemplary embodiments shown there, is guided displaceably in its longitudinal direction directly by a guide unit which is itself guided by a bearing unit displaceably in the transverse direction lying at right angles to the longitudinal direction of the valve rod. The guide unit is of relatively robust form in order to allow good guidance and also forms cylinder spaces for the longitudinal drive displacing the valve rod in its longitudinal direction.

SUMMARY

The object of the invention is to provide an advantageous vacuum valve of the type initially mentioned, which, along with relatively favorable production costs, possesses a stable and reliable design. This is achieved by a vacuum valve according to the invention.

In the vacuum valve according to the invention, a transmission piece is secured to the valve rod and is guided displaceably in the longitudinal direction by at least one preferably rod-shaped guide part. At least one transverse drive part of the transverse drive engages on the guide part or on a respective guide part, the guide part being displaceable in the transverse direction by the at least one transverse drive part, and the guide part, during its displacement in the transverse direction, taking along the transmission piece. During the displacement of the at least one guide part in the transverse direction, displacement of the valve rod in the transverse direction therefore also takes place.

Advantageously, at least one guide part, on which in each case at least one transverse drive part engages, is arranged on each of the two sides of the valve rod with respect to a direction lying at right angles to the longitudinal direction and at right angles to the transverse direction. Thus, in each case at least one such guide part lies on opposite sides of a plane running through the longitudinal axis of the valve rod and lying parallel to the longitudinal direction and to the transverse direction.

By virtue of the invention, stable guidance in the longitudinal direction and in the transverse direction is made possible without the use of an excessive amount of material, and high closing forces in the transverse direction can be transmitted reliably.

Advantageously, to adjust the transmission piece in the longitudinal direction, at least one longitudinal drive part is connected to the transmission piece, the connection being designed such that displacement of the transmission piece with respect to the longitudinal drive part in the transverse direction is possible. The longitudinal drive part can consequently itself be arranged nondisplaceably in the transverse direction. For example, the at least one longitudinal drive part may be a piston rod of a piston/cylinder unit.

The transmission piece is beneficially arranged in an inner space of a transverse drive housing which is held nondisplaceably in the longitudinal and the transverse direction. At least one housing part of the longitudinal drive, with respect to which housing part the at least one longitudinal drive part of the longitudinal drive is displaceable in the longitudinal direction and is nondisplaceable in the transverse direction, is advantageously connected rigidly to the transverse drive housing.

Displaceable guidance of the at least one guide part in the transverse direction and the nondisplaceable holding of the at least one guide part in the longitudinal direction advantageously take place as a result of the mounting, displaceable in the transverse direction, of at least one element connected to the guide part by means of the transverse drive housing. In particular, parts of the transverse drive can be guided displaceably in the transverse direction by the transverse drive housing, such as, for example, the at least one transverse drive part engaging on the guide part or on the respective guide part, if appropriate in conjunction with the guidance, displaceable in the transverse direction, of further parts of the transverse drive, for example of a piston.

In an advantageous embodiment of the invention, a first and a second closing member are fastened to the valve rod. In a first end position of the valve rod, the first closing member is pressed onto a first valve seat which surrounds a first valve orifice of the vacuum valve. In a second end position of the valve rod, the second closing member is pressed onto a second valve seat which surrounds a second valve orifice of the vacuum valve. In such a vacuum valve, servicing of the second closing member can advantageously be carried out, for example in order to replace a sealing ring of the second closing member, when the valve rod is in its first end position, and servicing of the first closing member be carried out, for example in order to replace a sealing ring of the first closing member, when the valve rod is in its second end position. In this case, vacuum-tight sealing between two vacuum spaces, for example of vacuum chambers, which are connected via the vacuum valve in the open state of the latter, can be maintained.

The transverse drive is advantageously provided with at least one spring element, by which the valve rod, when in its end position or in one of its end positions, is prestressed in the direction of its intermediate position. If the transverse drive has drive parts, in particular pistons, acting in opposite directions parallel to the transverse direction, in order to adjust the valve rod from its intermediate position into first and second end positions, there is advantageously for each of the two end positions at least one spring element which acts upon the valve rod from its respective end position in the direction of its intermediate position. The valve rod can consequently be moved into a defined intermediate position in a simple way. In one possible embodiment, stop means may in this case be provided, which, during the displacement of the valve rod into its at least one end position, come to bear against part of a transverse drive housing and at the same time are displaced counter to the force of a spring. In particular, such stop means may be arranged in recesses of pistons of the transverse drive.

When this publication refers in general to an arrangement or holder which is not displaceable with respect to the longitudinal direction or transverse direction, this means both directions parallel to the longitudinal direction or both directions parallel to the transverse direction.

BRIEF DESCRIPTION OF THE DRAWINGS

Further advantages and details of the invention are explained below by means of the accompanying drawing in which:

FIG. 1 shows a view of a vacuum valve according to the invention in the open state;

FIGS. 2 and 3 show a side view and a top view of the vacuum valve from FIG. 1;

FIG. 4 shows a section along the line AA of FIG. 1;

FIG. 5 shows a section along the line BB of FIG. 1;

FIG. 6 shows an enlarged detail X from FIG. 5;

FIG. 7 shows a section along the line CC from FIG. 1;

FIGS. 8 to 11 show illustrations corresponding to FIGS. 4 to 7 in the intermediate position of the valve rod;

FIGS. 12 to 15 show illustrations corresponding to FIGS. 4 to 7 in the first end position of the valve rod;

FIGS. 16 to 19 show illustrations corresponding to FIGS. 4 to 7 in the second end position of the valve rod;

FIG. 22 shows an oblique view of the valve rod with the transmission piece, with the guide parts and with the pistons of the longitudinal and the transverse drive;

DETAILED DESCRIPTION OF THE PREFERRED EMBODIMENTS

Figure 20:
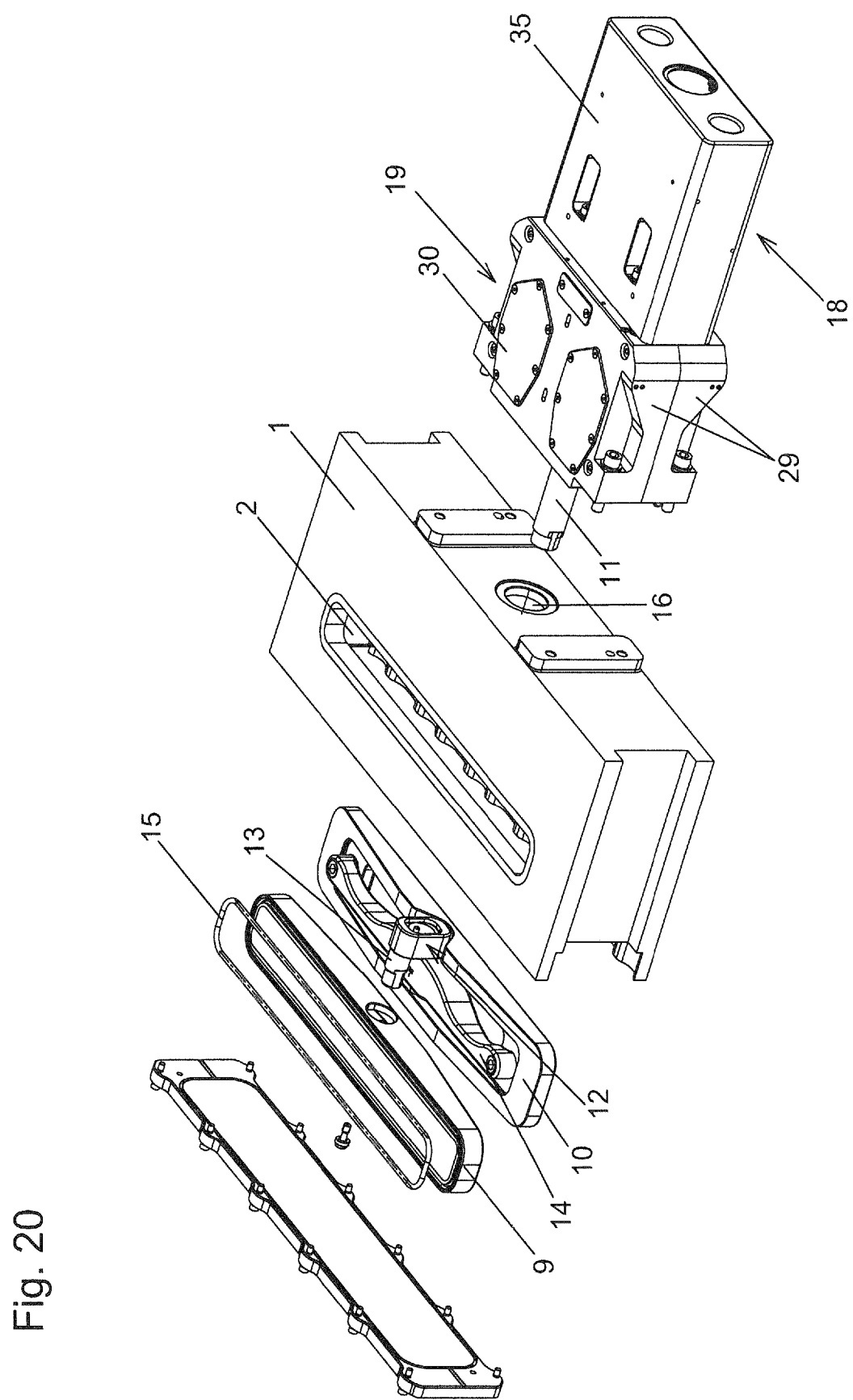
FIG. 20 shows an oblique view of the vacuum valve, parts of the vacuum valve being illustrated in exploded form.
Figure 21:
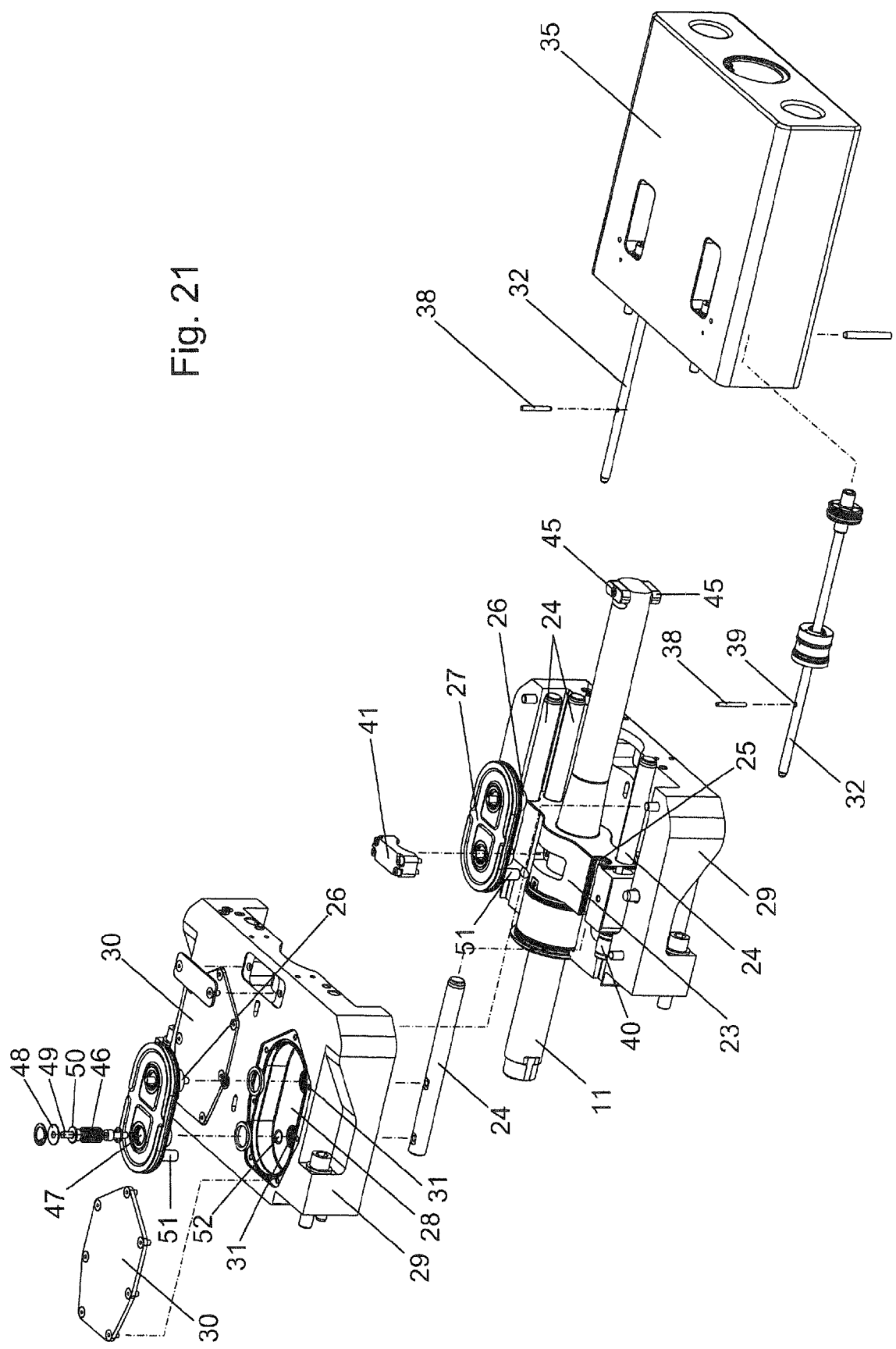
FIG. 21 shows an oblique view of the valve rod with the longitudinal and the transverse drive, parts of the longitudinal and the transverse drive being illustrated in exploded form.
Figure 25:
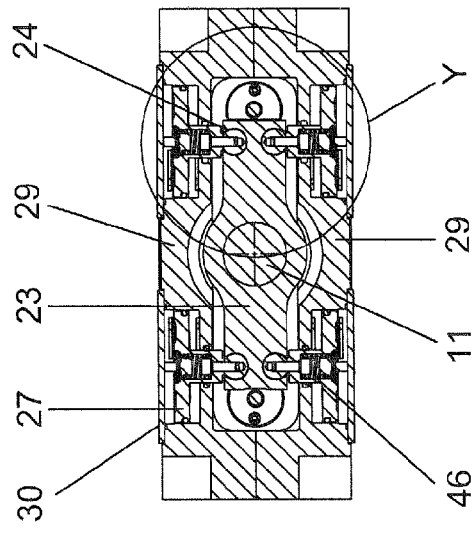
FIG. 25 shows a section along the line DD in FIG. 8.
Figure 26:
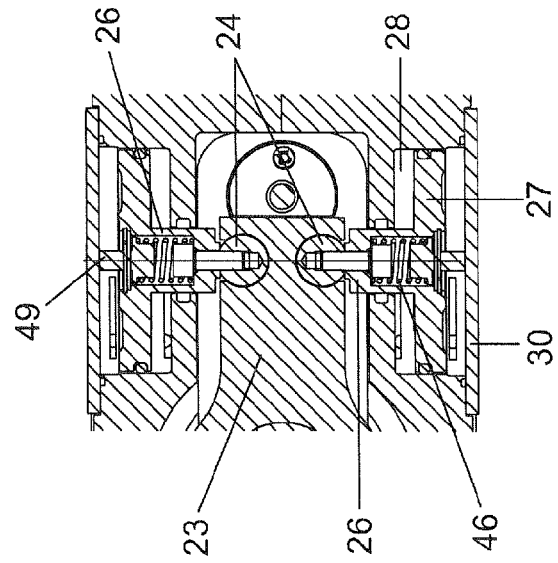
FIG. 26 shows an enlarged detail Y from FIG. 25.
Figure 23:
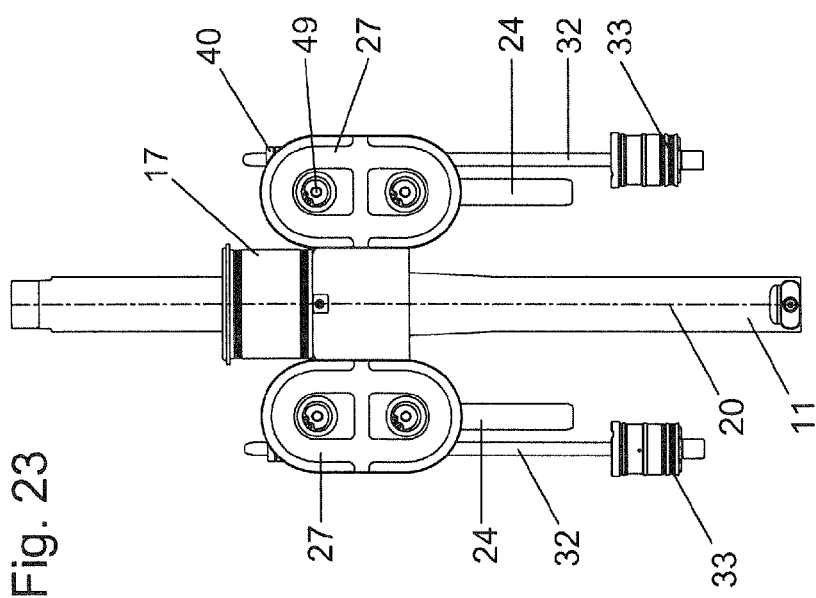
FIG. 23 and FIG. 24 show the parts of FIG. 22 in a front view and a top view.
Figure 24:
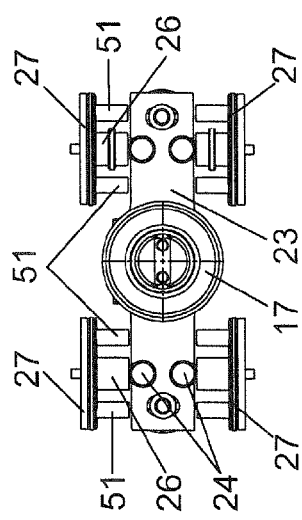

An exemplary embodiment of the invention is illustrated in FIGS. 1 to 26. The vacuum valve comprises a valve housing 1 with first and second valve orifices 2, 3 which have axes 4, 5 and are arranged in opposite walls of the valve housing 1. The walls surrounding the valve orifices 2, 3 have on their sides facing one another first and second valve seats 6, 7 which surround the valve orifices 2, 3.

The valve housing 1 possesses an inner space 8 which forms a vacuum region of the vacuum valve, that is to say the inner space 8, apart from the valve orifices 2, 3, is sealed off, vacuum-tight, with respect to the outside space of the vacuum valve.

Arranged in the inner space 8 of the valve housing 1 are a first and a second closing member 9, 10 designed in each case in the form of a valve plate. The closing members 9, 10 are attached to a valve rod 11 which carries them and which possesses a longitudinal axis 20.

In the exemplary embodiment shown, in each case at least one elastomeric sealing ring 15 is arranged on the first and second closing member 9, 10, and the valve seats 6, 7 are formed by sealing surfaces.

A reverse design is basically also possible, in which the valve seats 6, 7 have sealing rings and the closing members 9, 10 have sealing surfaces.

The valve seats 6, 7 lie in each case in one plane. Preferably, the planes of the valve seats are parallel to one another, as illustrated in the exemplary embodiment shown. The axes 4, 5 of the valve orifices 2, 3 lie at right angles to the planes in which the valve seats 6, 7 lie.

For example, connection to the valve rod 11 may take place, as illustrated, via a connecting piece 12 which has two extensions 13, to which in each case a carrier 14 is screwed, which, in turn, is screwed at its two ends to the respective closing member 9, 10. As a result of torsion of the carrier 14, a certain pivoting of the respective closing member 9, 10 about an axis lying at right angles to the longitudinal axis 20 and parallel to the plane of the respective valve seat 6, 7 is possible, so that a largely uniform pressure force of the sealing ring 15 onto the sealing surface is achieved. The connection of the closing members 9, 10 to the valve rod 11 may also take place in another way.

The valve rod 11 is led out of the valve housing through an orifice 16 of the latter, so that a portion of the valve rod, to which portion the closing members 9, 10 are attached, is located inside the valve housing 1 and a further portion of the valve rod 11 is located outside the valve housing 1. The leadthrough of the valve rod 11 through the valve housing 1 is designed to be vacuum-tight, in the exemplary embodiment shown by means of a bellows 17, by which one end is connected, vacuum-tight, to the valve housing 1 and the other end is connected, vacuum-tight, to the valve rod 11.

A longitudinal drive 18 and a transverse drive 19 cooperate with that portion of the valve rod 11 which is located outside the valve housing 1, that is to say the longitudinal drive 18 and the transverse drive 19 are arranged outside the vacuum region of the vacuum valve. The longitudinal drive 18 serves for displacing the valve rod 11 in a longitudinal direction 21 which lies parallel to the longitudinal axis 20 of the valve rod 11 and which is designated in the figures by a double arrow. The transverse drive 19 serves for displacing the valve rod 11 in a transverse direction 22 which lies at right angles to the longitudinal axis 20 of the valve rod 11 and which is designated in the figures by a double arrow. During displacement of the valve rod 11 in the longitudinal direction 21, the position of the longitudinal axis 20 of the valve rod 11 does not change. During displacement of the valve rod 11 in the transverse direction 22, the longitudinal axis 20 of the valve rod 11, after displacement, lies parallel to its position before displacement. In other words, the displacements in the longitudinal direction 21 and the transverse direction 22 are parallel displacements of the valve rod 11.

In a parallel arrangement of the planes in which the valve seats 6, 7 lie, the longitudinal direction 21 lies parallel to these planes. The transverse direction 22 stands at right angles to these planes. If the planes of the valve seats 6, 7 were to form an angle with one another, the longitudinal direction 21 would lie parallel to the plane which lies on the bisecting line of this angle and the transverse direction 22 would lie at right angles to this plane lying at the bisecting line.

In the completely open state of the vacuum valve, as illustrated in FIGS. 1 to 7, the valve rod 11 assumes an initial position. The closing members 9, 10 are in their open positions in which they completely release the valve orifices 2, 3 (as seen in the direction of the axes 4, 5).

By means of the longitudinal drive 18, the valve rod 11 can be displaced from its initial position in the longitudinal direction 21 into the intermediate position illustrated in FIGS. 8 to 11. In the intermediate position of the valve rod 11, the closing members 9, 10 assume their middle positions in which they overlap the valve orifices 2, 3, as seen in the direction of the axes 4, 5, but are lifted off from the valve seats 6, 7.

By means of the transverse drive 19, the valve rod 11 can be displaced from the middle position in the transverse direction 22 into the first end position illustrated in FIGS. 12 to 15 and into the second end position illustrated in FIGS. 16 to 19. In the first end position, the first closing member 9 assumes its closing position in which it is pressed onto the first valve seat 6 and closes the first valve orifice 2. In the second end position, the second closing member 10 assumes its closing position in which it is pressed onto the second valve seat 7 and closes the second valve orifice 3. The closure of the respective valve orifice 2, 3 is vacuum-tight. In the context of this publication, "vacuum-tight" is intended to mean that a vacuum of less than $1 \cdot 10^{-3}$ mbar can be maintained for at least more than one hour in the vacuum region of the vacuum valve (it is assumed in this case that the other valve orifice is sealed off completely; in practice, it is connected to an evacuated space, for example a vacuum chamber).

A transmission piece 23 is secured to that portion of the valve rod 11 which lies outside the valve housing 1. The transmission piece 23 is connected to the valve rod 11 nondisplaceably in the longitudinal and the transverse direction.

The transmission piece 23 is guided displaceably in the longitudinal direction 21 by guide parts 24 which are held nondisplaceably in the longitudinal direction 21. The guide parts 24 form a linear guide for the transmission piece 23 in the longitudinal direction 21. In the exemplary embodiment, this transmission piece 23 is designed in the form of a plain bearing, as is preferred.

The transmission piece 23 is held nondisplaceably in the transverse direction 22 at least by all the guide parts 24 together. In the exemplary embodiment, the transmission piece 23 is held nondisplaceably in the transverse direction 22 by each guide part 24 individually.

The transmission piece 23 and the guide parts 24 are located outside the vacuum region of the vacuum valve.

The transmission piece 23 of the exemplary embodiment shown could also be designated as a yoke.

The guide parts 24 are designed in the form of rods and pass through recesses 25 of the transmission piece 23. The recesses 25 are in each case open in the transverse direction 22 to the margin of the transmission piece 23 and surround the respective guide part 24 over more than 180°. The transmission piece 23 is thereby displaceable in relation to a respective guide part 24 in the longitudinal direction 21, but is held nondisplaceably in the transverse direction 22.

A linear guide of the transmission piece 23 in the longitudinal direction 21 could also be designed in another way. In other designs of linear guides, the guide parts 24 could, for example, have in each case a portion projecting into an undercut groove and a portion lying outside this undercut groove, for example in the manner of a dovetail guide. Instead of the cylindrical design of the guide parts 24, as shown, these could therefore have, for example, bar-shaped designs with other cross sections.

In each case transverse drive parts 26 which are designed in the form of piston rods are fastened to the guide parts 24. Fastening takes place at locations on the guide parts 24 which, during the longitudinal displacement of the transmission piece 23, come to lie in those regions of the recesses 25 which are open to the margin of the transmission piece 23 with respect to the transverse direction. Fastening could also take place at locations which, during the displacement of the valve rod 11 from its initial position into its intermediate position, lie laterally next to the transmission piece 23 (with respect to the longitudinal direction 21) over the entire displacement travel of the latter. In this case, the guide parts 24 could also pass through recesses 25 (in the form of bores through the transmission piece 23) which are closed to the margin of the transmission piece 23.

The transverse drive parts 26 designed in the form of piston rods in the exemplary embodiment are fastened to pistons 27 of the transverse drive 19. The pistons 27 of the transverse drive 19 lie in cylinder spaces 28. In the exemplary embodiment shown, the cylinder spaces 28 are formed by inner spaces of a transverse drive housing. The transverse drive housing comprises two basic bodies 29 connected rigidly to one another. To form the cylinder spaces 28, these basic bodies possess recesses which are closed by covers 30. The transverse drive housing 29, 30 is connected rigidly to the valve housing 1.

Two guide parts 24 are arranged on each of the two sides of the valve rod 11 with respect to a direction standing at right angles to the longitudinal direction 21 and to the transverse direction 22. In other words, in each case two guide parts 24 lie on both sides of a plane lying parallel to the longitudinal and the transverse direction 21, 22 and passing through the longitudinal axis 20. The two guide parts 24 lying on each side of said plane are spaced apart from one another in the transverse direction 19, at the same time lying on both sides of a plane lying parallel to the longitudinal direction 21 and at right angles to the transverse direction 22 and passing through the longitudinal axis 20 of the valve rod. The transverse drive parts 26 fastened to the two guide parts 24 lying on both sides of the last-mentioned plane project from the guide parts 24 in directions which are directed away from one another (and which lie parallel to the transverse direction 22).

In the exemplary embodiment shown, each piston 27 is connected to the respective guide part 24 via two transverse drive parts 26 designed in the form of piston rods. Such a connection could instead also take place via only one transverse drive part 26.

The guide parts 24 are held nondisplaceably in the longitudinal direction 21 as a result of their connection to the transverse drive parts 26 and can be displaced in the transverse direction 22 by the transverse drive 19. In the exemplary embodiment, the guidance of the guide parts 24 which is displaceable in the transverse direction 22 comprises guidance supporting the transverse drive parts 26 displaceably in the transverse direction 22 and the displaceable guidance of the pistons 27 in the transverse direction 22. The pistons 27 are guided displaceably in the transverse direction 22 by the margins of the cylinder spaces 28, and the transverse drive parts 26 are guided displaceably in the transverse direction 22 by margins of orifices 31 (cf. FIG. 21) in the transverse drive housing, through which orifices transverse drive parts 26 extend. Moreover, guide tenons 51 are arranged on the pistons 27 and are guided displaceably in the transverse direction in guide bores 52 (cf. FIG. 21) in the basic body 29 which extend in the transverse direction 22. Displaceable guidance in the transverse direction 22 could also take place in another way, for example the guide tenons 51 and guide bores 52 could be dispensed with or only the pistons 27 could be guided displaceably in the transverse direction 22.

To adjust the transmission piece 23 in the longitudinal direction, longitudinal drive parts 32 are connected to the transmission piece 23 and are formed by piston rods to which pistons 33 of the longitudinal drive 18 are attached. The pistons 33 are arranged in cylinder spaces 34. In the exemplary embodiment, these are formed by inner spaces of a longitudinal drive housing. For this purpose, the longitudinal drive housing possesses a basic body 35 with recesses which are closed by covers 36a, 36b. The piston rod forming the longitudinal drive part 32 extends through a bore of the cover 36b.

The longitudinal drive housing 35, 36 is connected rigidly to the transverse drive housing 29, 30.

The longitudinal drive parts 32, which are themselves nondisplaceable in the transverse direction 22, are connected displaceably in the transverse direction 22 to the transmission piece 23. For this purpose, in the exemplary embodiment, they pass through the transmission piece 23 through passage orifices 37 which extend in the longitudinal direction 21 and of which the clear width in the transverse direction 22 is in each case greater than the extent of the longitudinal drive part 32 in the transverse direction 22. The respective passage orifice 37 is traversed by a connecting pin 38 held in bores in the transmission piece 23. The connecting pin 38 extends through a bore 39 (cf. FIG. 21) in the longitudinal drive part 32 with play, so that the longitudinal drive part 32 can be displaced in the transverse direction 22 with respect to the connecting piece 38.

In the portion projecting out of the transmission piece 23 on the opposite side of the piston 33, the longitudinal drive part 32 is held nondisplaceably in the transverse direction 22 by the transverse drive housing 29, 30 at least in the intermediate position and in the end positions of the valve rod 11. For this purpose, in the exemplary embodiment, the transverse drive part 26 is moved (cf. FIGS. 21, 22) into a sleeve 40 which is held in a recess of the transverse drive housing 29, 30 and with respect to which said transverse drive part can be displaced in the longitudinal direction 21.

A connection, displaceable in the transverse direction 22, of the longitudinal drive part 32 to the transmission piece 23 is also conceivable and possible in a way other than that illustrated. For example, an articulated connection between the transmission piece 23 and the respective longitudinal drive part 32 could also be present, in which case different longitudinal drive parts 32 could be present for the two directions of displacement parallel to the longitudinal direction 21 or displacement in one direction could take place by means of a spring.

In the exemplary embodiment, two longitudinal drive parts 32 are present, which are arranged on opposite sides of the valve rod 11 with respect to a direction lying at right angles to the longitudinal direction 21 and at right angles to the transverse direction 22 and which are connected in each case to the transmission piece 23.

In the exemplary embodiment shown, the transmission piece 23 is fastened to the valve rod 11 by means of a clamping piece 41 (cf. FIG. 21) which is screwed onto a basic body of the transmission piece 23. In the removed state of the clamping piece 41, the valve rod 11 can be removed from the transmission piece 23.

In the exemplary embodiment, the transverse drive 19 comprises, as described, the transverse drive housing 29, 30 forming the cylinder spaces 28, the pistons 27 and the transverse drive parts 26. For example, separate cylinders which are connected to the valve housing 1 nondisplaceably in the longitudinal and the transverse direction 21, 22 could also be present for each piston 27.

In the exemplary embodiment, the longitudinal drive comprises the longitudinal drive housing 35, 36 having the cylinder spaces 34, the pistons 33 arranged in the cylinder spaces 34 and the longitudinal drive parts 32. For example, a dedicated cylinder, which is connected (for example, via a transverse drive housing) to the valve housing 1 nondisplaceably in the longitudinal and the transverse direction 21, 22, could also be provided for each piston 33.

In the first and the second end position of the valve rod 11, the latter is supported on a respective transverse stop 42, 43 in a portion which lies outside the valve housing 1 and which extends from the region of connection of the valve rod 11 to the transmission piece 23 in the direction of that end of the valve rod 11 which is remote from the valve housing 1. In the exemplary embodiment, the transverse stops 42, 43 are attached to the basic body 35 of the longitudinal drive housing, specifically in an orifice 44 of the basic body 35, into which orifice the valve rod 11 projects. Abutment against the respective transverse stop 42, 43 preferably takes place in the region of the end of the valve rod 11. In the exemplary embodiment, stop pieces 45 for abutment against the respective transverse stop 42, 43 are attached to the valve rod.

By the valve rod 11 bearing in the respective end position against the respective transverse stop 42, 43, there is no need for any tilting movement to be absorbed by the transverse drive 19. The valve rod 11 is supported on both sides of the transverse drive 19 (on the one hand, via the respective closing member 9, 10 on the respective valve seat 6, 7 and, on the other hand, against the respective transverse stop 42, 43) and is subjected to bending load by the transverse drive 19.

To adjust the valve rod 11 from the initial position illustrated in FIGS. 4 to 7 into the intermediate position illustrated in FIGS. 8 to 11, the transmission piece 23 is displaced in the longitudinal direction 21 by the longitudinal drive 18. To adjust the valve rod 11 from the intermediate position illustrated in FIGS. 8 to 11 into the first end position corresponding to FIGS. 12 to 15 or into the second end position corresponding to FIGS. 16 to 19, the guide parts 24 are displaced in the corresponding direction parallel to the transverse direction 22 by the transverse drive 19 via the transverse drive parts 26. The displacement of the transmission piece 23 and consequently of the valve rod 11 in the transverse direction 22 takes place as a result. To displace the guide parts 24 in the transverse direction 22, pistons 33 of the transverse drive 19 are acted upon by a pressure medium, in particular compressed air. The pistons 27 arranged on one side push the transmission piece 23 and the pistons 27 arranged on the other side pull the transmission piece 23 (depending into which of the end positions the valve rod 11 is displaced) by means of the guide parts 24. In the exemplary embodiment, the pistons 27 are in each case designed as double-acting pistons, so that all the pistons 27 are active both during the adjustment of the valve rod 11 into the first end position and during the adjustment of the valve rod 11 into the second end position.

When the valve rod 11 is displaced from its intermediate position into one of its end positions, spring elements 46, which are arranged on that side of the transmission piece 23 toward which the valve rod 11 is displaced, are tensioned. In the exemplary embodiment, the spring elements are helical springs which are arranged in blindhole-like depressions 47 of the pistons 27. The depressions 47 are closed by perforated disks 48 through which a stop pin 49 projects in each case. The stop pin 49 possesses a head with a supporting collar 50. The respective helical spring lies between the bottom of the depression 47 and the supporting collar 50. When the valve rod 11 is displaced from its intermediate position into its end position, that end of the stop pin 49 which projects out of the perforated disk 48 comes to bear against the cover 30, so that the stop pin 49 is pressed in under the tension of the spring element 46.

The return of the valve rod 11 from the respective end position into the intermediate position takes place by means of the spring elements 46 in that the respective stop pins 49 are supported on the respective cover 30 and displace the pistons 27 in which they are arranged. The cylinder spaces 28 of all the pistons 27 are in this case switched to pressureless.

Various modifications to the exemplary embodiment of the invention, as shown, are conceivable and possible, without departing from the scope of the invention. Thus, for example, only one guide part 24 and/or only one piston 27 could be provided on each side of a plane passing through the longitudinal axis 20 of the valve rod 11 and lying parallel to the longitudinal direction 21 and parallel to the transverse direction 22. In this case, transverse drive parts 26 projecting in opposite directions could engage on a respective guide part.

If single-acting pistons are used instead of double-acting pistons 27, a respective piston 27 would be provided either only for pushing or only for pulling the transmission piece 23. If pistons 27 provided only for pushing the transmission piece 23 are used, the recess 25 could also surround the guide part 24 over less than 180° or another longitudinal guide without an undercut groove could be provided. The guide parts 24 could also be designed in a way other than that illustrated.

Instead of a bellows leadthrough for leading the valve rod out of the vacuum region, a sliding leadthrough could also be provided. This may have a sliding part possessing a through orifice through which the valve rod is led so as to be sealed off by means of a seal. The valve rod can consequently be displaced in the longitudinal direction with respect to this sliding part. The sliding part itself is mounted displaceably in the transverse direction 22 with respect to the valve housing 1, at the same time being sealed off with respect to the valve housing 1 by means of a seal. The sliding part thus forms a kind of slide sealed off with respect to the valve housing 1 and displaceable in the transverse direction 22. Such sliding leadthroughs which allow displaceability in two directions which, in particular, stand orthogonally to one another are known.

In the exemplary embodiment shown, two closing members 9, 10 are attached to the valve rod 11. Instead, only one closing member can also be attached to the valve rod 11. The valve rod would then be displaceable from the intermediate position only into an end position in which the closing member bears against the valve seat which surrounds a valve orifice of the valve housing. In such a vacuum valve, in one possible design variant, the valve housing could also be formed by a vacuum chamber. In other words, a separate valve housing could therefore be dispensed with and the vacuum valve would be designed as a part for insertion into the vacuum chamber, the valve rod being led, sealed off, out of the vacuum chamber.

KEY TO THE REFERENCE NUMERALS

1 Valve housing
2 First valve orifice
3 Second valve orifice
4 Axis
5 Axis
6 First valve seat
7 Second valve seat
8 Inner space
9 First closing member
10 Second closing member
11 Valve rod
12 Connecting piece
13 Extension
14 Carrier
15 Sealing ring
16 Orifice
17 Bellows
18 Longitudinal drive
19 Transverse drive
20 Longitudinal axis
21 Longitudinal direction
22 Transverse direction
23 Transmission piece
24 Guide part
25 Recess
26 Transverse drive part
27 Piston
28 Cylinder space
29 Basic body
30 Cover
31 Orifice
32 Longitudinal drive part
33 Piston
34 Cylinder space
35 Basic body
36a Cover
36b Cover
37 Passage orifice
38 Connecting pin
39 Bore
40 Sleeve
41 Clamping piece
42 Transverse stop
43 Transverse stop
44 Orifice
45 Stop piece
46 Spring element
47 Depression
48 Perforated disk
49 Stop pin
50 Supporting collar
51 Guide tenon
52 Guide bore

The invention claimed is:

1. A vacuum valve with a valve rod (11) which has a longitudinal axis (20) and which carries at least one closing member (9, 10) for closing at least one valve orifice (2, 3) and which can be displaced by a longitudinal drive (18), in a longitudinal direction (21) lying parallel to the longitudinal axis (20) of the valve rod (11), from an initial position, in which the vacuum valve is open, into an intermediate position, and can be displaced by a transverse drive (19) from the intermediate position to at least one end position in which the vacuum valve is closed, wherein a transmission piece (23) which is guided displaceably in the longitudinal direction (21) by at least one guide part (24) is secured to the valve rod (11), and wherein at least one transverse drive part (26) of the transverse drive (19) engages on the guide part (24), the guide part (24) being displaceable in the transverse direction (22) by the transverse drive (19) via the at least one transverse drive part (26), and the guide part (24), during its displacement in the transverse direction (22), carrying along the transmission piece (23).

2. The vacuum valve as claimed in claim 1, wherein the at least one guide part (24), on which in each case the at least one transverse drive part (26) engages, is arranged on each of two sides of the valve rod (11) with respect to a direction lying at right angles to the longitudinal direction (21) and at right angles to the transverse direction (22).

3. The vacuum valve as claimed in claim 1 or 2, wherein the transverse drive part (26) is a piston rod connected to a piston (27) of the transverse drive (19).

4. The vacuum valve as claimed in one of claims 1 to 3, wherein the at least one guide part (24) is designed in the form of a rod.

5. The vacuum valve as claimed in one of claims 2 to 4, wherein two of the guide parts (24), which are spaced apart from one another in the transverse direction (22) and on which in each case at least one of the transverse drive parts (26) engages, are arranged on each of the two sides of the valve rod (11) with respect to the direction lying at right angles to the longitudinal direction (21) and at right angles to the transverse direction (22).

6. The vacuum valve as claimed in one of claims 1 to 5, wherein the valve rod (11) carries a first and a second closing member (9, 10), and, in a first end position of the valve rod (11), the first closing member (9) is pressed onto a first valve seat (6) which surrounds a first valve orifice (2), and, in a second end position of the valve rod (11), the second closing member (10) is pressed onto a second valve seat (7) which surrounds a second valve orifice (3).

7. The vacuum valve as claimed in one of claims 1 to 6, wherein, to adjust the transmission piece (23) in the longitudinal direction (21), at least one longitudinal drive part (32) of the longitudinal drive (18) is connected to the transmission piece (23).

8. The vacuum valve as claimed in claim 7, wherein the at least one longitudinal drive part (32) is connected to the transmission piece (23) displaceably in the transverse direction (22).

9. The vacuum valve as claimed in claim 7 or 8, wherein the at least one longitudinal drive part (32) is a piston rod connected to a piston (33) of the longitudinal drive (18).

10. The vacuum valve as claimed in one of claims 1 to 9, wherein the vacuum valve has a valve housing (1), inside which the at least one closing member (9, 10) is arranged.

11. The vacuum valve as claimed in one of claims 1 to 10, wherein the transmission piece (23) is arranged in an inner space of a transverse drive housing (29, 30) nondisplaceable in the longitudinal direction (21) and transverse direction (22).

12. The vacuum valve as claimed in claim 11, wherein the at least one guide part (24) is guided displaceably in the transverse direction (22) with respect to the transverse drive housing (29, 30) and is held nondisplaceably in the longitudinal direction (21).

13. The vacuum valve as claimed in one of claims 1 to 12, wherein the transverse drive (19) has at least one spring element (46), by which the valve rod (11), when it is in an end position or in one of its end positions, is prestressed in a direction of the intermediate position.

14. The vacuum valve as claimed in one of claims 1 to 13, wherein, in the end position or the respective end position of the valve rod (11), a portion of the valve rod (11), which portion extends from a region of connection to the transmission piece (23) as far as one end, remote from the at least one closing member (9, 10) of the valve rod (11), is supported on a transverse stop or a respective transverse stop (42, 43).

* * * * *